United States Patent [19]
Ishiwata

[11] Patent Number: 5,910,870
[45] Date of Patent: Jun. 8, 1999

[54] MAGNETORESISTIVE EFFECT COMPOSITE HEAD WITH LAMINATED MAGNETIC LAYER ISOLATED FROM MAGNETIC POLE LAYER

[75] Inventor: Nobuyuki Ishiwata, Tokyo, Japan

[73] Assignee: NEC Corporation, Tokyo, Japan

[21] Appl. No.: 08/958,712

[22] Filed: Nov. 17, 1997

[30] Foreign Application Priority Data

Nov. 15, 1996 [JP] Japan .................................. 8-304435

[51] Int. Cl.⁶ .............................. G11B 5/147; G11B 5/39
[52] U.S. Cl. ............................................ 360/113; 360/126
[58] Field of Search ..................................... 360/113, 126

[56] References Cited

U.S. PATENT DOCUMENTS

| | | | |
|---|---|---|---|
| 5,085,935 | 2/1992 | Mallary | 428/336 |
| 5,436,781 | 7/1995 | Matono et al. | 460/126 |
| 5,590,008 | 12/1996 | Tanabe et al. | 360/126 |
| 5,739,991 | 4/1998 | Matono et al. | 360/113 |
| 5,750,275 | 5/1998 | Katz et al. | 428/694 R |
| 5,768,073 | 6/1998 | Nepela et al. | 360/126 |
| 5,792,547 | 8/1998 | Liu et al. | 428/212 |
| 5,822,159 | 10/1998 | Fukuyama et al. | 360/113 |

OTHER PUBLICATIONS

M. Yoshida, et al., "Edge Eliminated Head", pp. 3837–3839, IEEE Transactions on Magnetics, vol. 29, No. 6, Nov. 1993.

*Primary Examiner*—Jefferson Evans
*Attorney, Agent, or Firm*—Young & Thompson

[57] ABSTRACT

A multi-layer structure includes a magnetic pole layer, a magnetic isolation layer extending over the magnetic pole layer, and a magnetic layer extending over the magnetic isolation layer so that the magnetic layer is isolated by the magnetic isolation layer from the magnetic pole layer, the magnetic layer having a unidirectional magnetization in parallel to an interface between the magnetic isolation layer and the magnetic layer, the magnetic isolation layer being capable of suppressing a generation of exchange coupling between the magnetic layer and the magnetic pole layer, so that a magnetization of the magnetic pole layer is biased and stabilized in a direction antiparallel to a direction of magnetization of magnetic layer by static magnetic coupling of the magnetization of the magnetic layer.

20 Claims, 2 Drawing Sheets

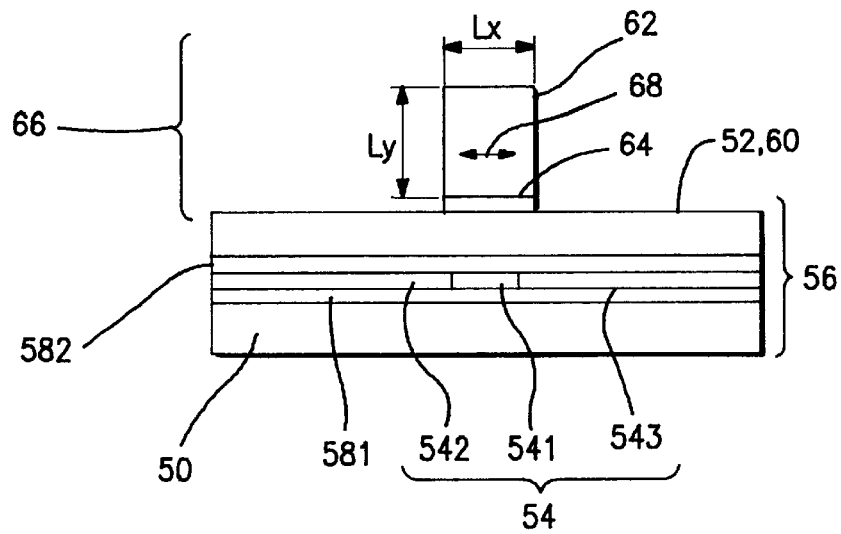
FIG. 1
PRIOR ART
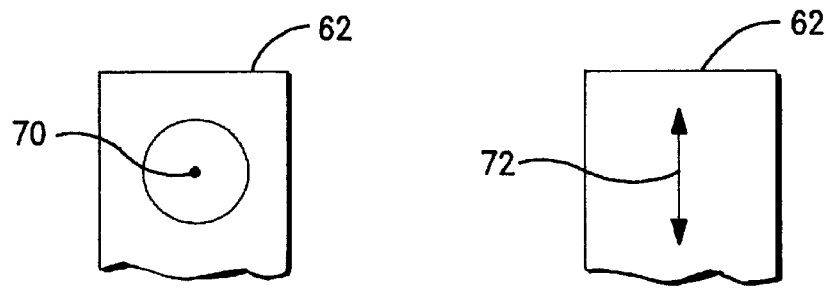
FIG. 2A
PRIOR ART
FIG. 2B
PRIOR ART
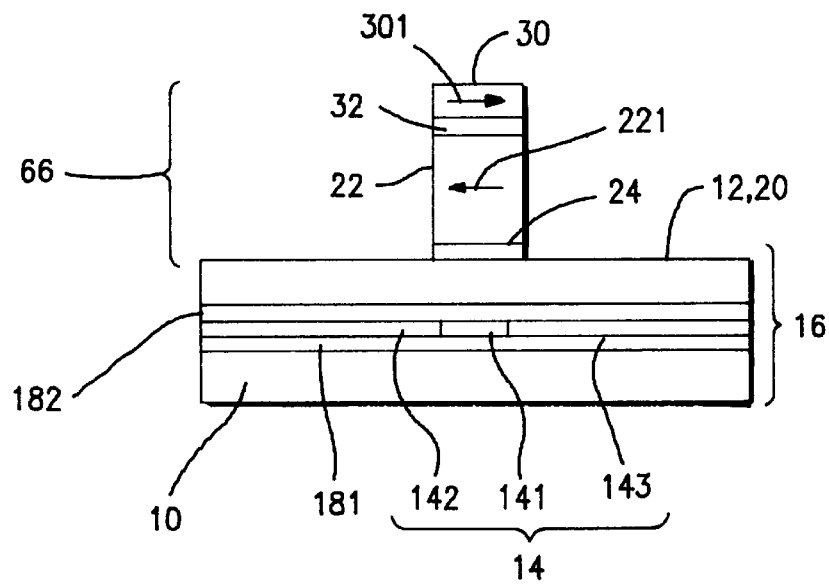
FIG. 3

MAGNETORESISTIVE EFFECT COMPOSITE HEAD WITH LAMINATED MAGNETIC LAYER ISOLATED FROM MAGNETIC POLE LAYER

BACKGROUND OF THE INVENTION

The present invention relates to a magnetoresistive effect head having laminations of a magnetoresistive effect head as a reproducing head and an inductive head as a recording head.

As the recording medium size is scaled down and increases in capacity, a relative speed between the magnetic head as the reproducing head and the magnetic recording medium is required to be small. In this circumstances, an expectation of the magnetoresistive effect head has been on the increase as the reproducing output of the magnetoresistive effect head is independent from the relative speed between the head and the magnetic recording medium. Such expected magnetoresistive effect head is, for example, disclosed in IEEE Transaction On Magnetics 7, No. 6, 1990, p. 150, "A Magnetoresistivity Readout Transducer".

FIG. 1 is a fragmentary cross sectional elevation view illustrative of a conventional magnetoresistive effect head having laminations of a magnetoresistive effect head as a reproducing head and an inductive head as a recording head in a direction from an air bearing face which faces to the surface of the magnetic recording medium.

The conventional magnetoresistive effect composite head has a magnetoresistive effect head portion 56 as a reproducing head and an inductive head portion 66 as a recording head. The magnetoresistive effect head portion 56 comprises a sandwiching structure, wherein a magnetoresistive effect element 54 is sandwiched by first and second magnetic isolation layers 581 and 582 which are further sandwiched by first and second magnetic shielding layers 50 and 52. The magnetoresistive effect element 54 comprises a center region 541 capable of sensing magnetic and first and second side regions 542 and 543 which are positioned on opposite sides of the center region 541 for supplying currents and a vertical bias magnetic field to the center region 541. The inductive head portion 66 comprises a magnetic gap 64 sandwiched by first and second magnetic pole layers 60 and 62. The first magnetic pole layer 60 of the inductive head portion 66 commonly serves as the second magnetic shielding layer 52. The first and second magnetic pole layers 60 and 62 have thin film coils. The magnetoresistive effect head portion 56 and the inductive head portion 66 are unitary formed with each other in the form of a single composite head.

It is required that the magnetic anisotropy of the first and second magnetic pole layers 60 and 62 be directed along an arrow mark 68 which is parallel to the width direction of the second magnetic pole layer 62 in order to increase the recording characteristic under high frequency conduction. The direction parallel to faces of the first and second magnetic pole layers 60 and 62 and parallel to the air bearing face is the easy axis of magnetization. As a result, the recording magnetic field is generated by magnetization rotation in a direction of a hard axis of magnetization, for which reason a large magnetic field is generated even under a high frequency condition.

In the Japanese laid-open patent publication No. 5-1821145, to improve the recording characteristic, the magnetic pole layer comprises laminations of a magnetic material and an insulation material to suppress generation of an eddy current for the purpose of reduction in an eddy current loss in a high frequency range. In this conventional method, however, it is not ensured that the recording magnetic field is generated by the magnetization rotation in a direction along the hard axis. Accordingly, even when the eddy current loss is suppressed, the necessary intensity of the magnetic field for recording into the magnetic recording medium can not be obtained.

In the prior art, the width "Lx" of the first magnetic pole layer 62 is relatively wide in relation to the height "Ly" of the first magnetic pole layer 62, wherein the width "Lx" of the first magnetic pole layer 62 substantially defines the track width of the magnetic recording. If, for example, a NiFe magnetic pole layer 62 is formed by electrodeposition, the desired magnetic anisotropy can be formed by formation of the NiFe layer under application of the magnetic filed in the direction along the arrow mark 68.

In recent years, however, as the high density of the magnetic recording medium or magnetic disc is promoted, the width "Lx" of the first magnetic pole layer 62 becomes narrower in relation to the height "Ly" of the first magnetic pole layer 62. As a result, even if the NiFe layer is formed under the application of the magnetic filed in the direction along the arrow mark 68, then the magnetic anisotropy may be directed either in a direction vertical to the air bearing surface as shown in FIG. 2A by an arrow mark 70 or in another direction along the height direction of the first magnetic pole layer 62 as shown in FIG. 2B by an arrow mark 72 due to anisotropy of the shape. This unstability of the direction of the magnetic anisotropy causes a deterioration of the recording characteristic in high frequency range and a reduction in yield of the manufacturing of the head.

SUMMARY OF THE INVENTION

Accordingly, it is an object of the present invention to provide a novel magnetoresistive effect head having a magnetoresistive effect head portion as a reproducing head and an inductive head portion as a recording head, which is free from the above problems.

It is a further object of the present invention to provide a novel magnetoresistive effect head having a magnetoresistive effect head portion as a reproducing head and an inductive head portion as a recording head, which is capable of suppressing the deterioration of the recording characteristic in the high frequency range where high density recording of the magnetic disc device is required.

It is a still further object of the present invention to provide a novel magnetoresistive effect head having a magnetoresistive effect head portion as a reproducing head and an inductive head portion as a recording head, which is capable of preventing a reduction in yield of the manufacturing of the head.

The above and other objects, features and advantages of the present invention will be apparent from the following descriptions.

The present invention provides a multi-layer structure comprising a magnetic pole layer, a magnetic isolation layer extending over said magnetic pole layer, and a magnetic layer extending over said magnetic isolation layer so that said magnetic layer is isolated by said magnetic isolation layer from said magnetic pole layer, wherein said magnetic layer has a unidirectional magnetization in parallel to an interface between said magnetic isolation layer and said magnetic layer, whilst said magnetic isolation layer is capable of suppressing a generation of exchange coupling between said magnetic layer and said magnetic pole layer, whereby a magnetization of said magnetic pole layer is biased and stabilized in a direction antiparallel to a direction of said magnetization of said magnetic layer by static magnetic coupling of said magnetization of said magnetic layer.

BRIEF DESCRIPTION OF THE DRAWINGS

Preferred embodiments according to the present invention will be apparent from the following descriptions.

FIG. 1 is fragmentary cross sectional elevation view illustrative of a conventional magnetoresistive effect head having laminations of a magnetoresistive effect head as a reproducing head and an inductive head as a recording head in a direction from an air bearing face which faces to the surface of the magnetic recording medium.

FIG. 2A is a view illustrative of that the magnetic anisotropy may be directed in a direction vertical to the air bearing surface.

FIG. 2B is a view illustrative of that the magnetic anisotropy may be directed in another direction along the height direction of the first magnetic pole layer.

FIG. 3 is a fragmentary cross sectional elevation view illustrative of a novel magnetoresistive effect head having laminations of a magnetoresistive effect head as a reproducing head and an inductive head as a recording head in a direction from an air bearing face which faces to the surface of the magnetic recording medium in a first embodiment according to the present invention.

DISCLOSURE OF THE INVENTION

Figure 4:
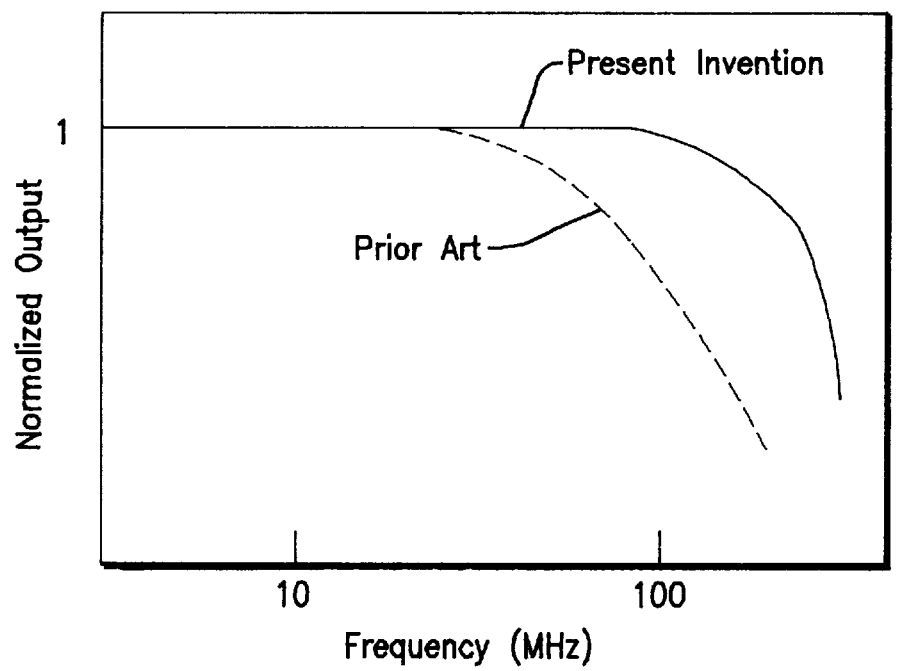
FIG. 4 is a graph showing variations of normalized outputs of the novel and conventional magnetoresistive effect composite heads versus frequency.

The present invention provides a multi-layer structure comprising a magnetic pole layer, a magnetic isolation layer extending over said magnetic pole layer, and a magnetic layer extending over said magnetic isolation layer so that said magnetic layer is isolated by said magnetic isolation layer from said magnetic pole layer, wherein said magnetic layer has a unidirectional magnetization in parallel to an interface between said magnetic isolation layer and said magnetic layer, whilst said magnetic isolation layer is capable of suppressing a generation of exchange coupling between said magnetic layer and said magnetic pole layer, whereby a magnetization of said magnetic pole layer is biased and stabilized in a direction antiparallel to a direction of said magnetization of said magnetic layer by static magnetic coupling of said magnetization of said magnetic layer.

The present invention also provides a multi-layer structure of an inductive transducer unitary formed with a magnetoresistive effect transducer. The multi-layer stricture comprises the following elements. A magnetic pole layer extends over a magnetic gap layer provided on a counterpart magnetic pole layer, wherein the magnetic gap layer is sandwiched between the magnetic pole layer and the counterpart magnetic pole layer, and the counterpart magnetic pole layer serves as one of paired magnetic shielding layers of the magnetoresistive effect transducer. A magnetic isolation layer extends over the magnetic pole layer. A magnetic layer extends over the magnetic isolation layer so that the magnetic layer is isolated by the magnetic isolation layer from the magnetic pole layer, wherein the magnetic layer has a unidirectional magnetization in parallel to a face which faces to a surface of a magnetic recording medium and also parallel to an interface between the magnetic isolation layer and the magnetic layer, whilst the magnetic isolation layer is capable of suppressing a generation of exchange coupling between the magnetic layer and the magnetic pole layer, whereby a magnetization of the magnetic pole layer is biased and stabilized in a direction antiparallel to a direction of the magnetization of the magnetic layer by static magnetic coupling of the magnetization of the magnetic layer.

The present invention also provides a transducer comprising an inductive transducer portion and a magnetoresistive effect transducer portion unitary formed with the inductive transducer portion. The inductive transducer portion comprises the following elements. A magnetic pole layer extends over a magnetic gap layer provided on a counterpart magnetic pole layer, wherein the magnetic gap layer is sandwiched between the magnetic pole layer and the counterpart magnetic pole layer, and the counterpart magnetic pole layer serves as one of paired magnetic shielding layers of the magnetoresistive effect transducer portion. A magnetic isolation layer extends over the magnetic pole layer. A magnetic layer extends over the magnetic isolation layer so that the magnetic layer is isolated by the magnetic isolation layer from the magnetic pole layer, wherein the magnetic layer has a unidirectional magnetization in parallel to a face which faces to a surface of a magnetic recording medium and also parallel to an interface between the magnetic isolation layer and the magnetic layer, whilst the magnetic isolation layer is capable of suppressing a generation of exchange coupling between the magnetic layer and the magnetic pole layer, whereby a magnetization of the magnetic pole layer is biased and stabilized in a direction antiparallel to a direction of the magnetization of the magnetic layer by static magnetic coupling of the magnetization of the magnetic layer.

The present invention also provides a magnetoresistive effect composite head comprising an inductive head and a magnetoresistive effect head unitary formed with the inductive transducer portion. The inductive head comprises the following elements. A magnetic pole layer extends over a magnetic gap layer provided on a counterpart magnetic pole layer, wherein the magnetic gap layer is sandwiched between the magnetic pole layer and the counterpart magnetic pole layer, and the counterpart magnetic pole layer serves as one of paired magnetic shielding layers of the magnetoresistive effect head. A magnetic isolation layer extends over the magnetic pole layer. A magnetic layer extends over the magnetic isolation layer so that the magnetic layer is isolated by the magnetic isolation layer from the magnetic pole layer, wherein the magnetic layer has a unidirectional magnetization in parallel to a face which faces to a surface of a magnetic recording medium and also parallel to an interface between the magnetic isolation layer and the magnetic layer, whilst the magnetic isolation layer is capable of suppressing a generation of exchange coupling between the magnetic layer and the magnetic pole layer, whereby a magnetization of the magnetic pole layer is biased and stabilized in a direction antiparallel to a direction of the magnetization of the magnetic layer by static magnetic coupling of the magnetization of the magnetic layer.

It is possible that the magnetic layer comprises a single magnetic layer structure. In this case, it is also possible that the single magnetic layer structure is made of a permanent magnetic layer. It is also possible that the permanent magnetic layer is made of one selected from the group consisting of CoPt, CoPtCr, CoTaCr and CoPtTaCr. It is also possible that the permanent magnetic layer is made of a Co-based magnetic material.

Alternatively, it is also possible that the magnetic layer comprises laminations of a soft magnetic layer extending over the magnetic isolation layer and an anti-ferromagnetic layer extending over the soft magnetic layer. In this case, it is also possible that the soft magnetic layer is made of NiFe. It is also possible that the soft magnetic layer is made of one selected from the group consisting of Co group amorphous materials. It is also possible that the anti-ferromagnetic layer is made of one selected from the group consisting of Mn—X, where X is at least one selected from the group of Fe, Ni, Co, Cr, Pt, Pd and Ir It is also possible that the anti-ferromagnetic layer is made of at least one oxide selected from the group consisting of Ni—O, Fe—O and Co—O.

In accordance with the present invention, even if a width "Lx" of a first magnetic pole layer is made narrow as compared to a height "Ly" of the first magnetic pole layer, a magnetic anisotropy of the first magnetic pole layer is stabilized in a direction parallel to an air bearing face of the head, which faces to a surface of a magnetic recording medium and also parallel to a surface of the first magnetic pole layer. Such magnetic anisotropy stabilization in the direction parallel to the air bearing face and also parallel to the surface of the first magnetic pole layer can be obtained by an application of a magnetic field to the first magnetic pole layer. Namely, a newly provided magnetic layer having a unidirectional magnetization in parallel to the air bearing face and also parallel to the surface of the first magnetic pole layer is laminated on a magnetic isolation layer which extends over the first magnetic pole layer so that the magnetic anisotropy of the first magnetic pole layer is stabilized in a direction parallel to the air bearing face and also parallel to a surface of the first magnetic pole layer.

The magnetic isolation layer disposed between the newly provided magnetic layer and the first magnetic pole layer is capable of suppressing a generation of exchange coupling between the newly provided magnetic layer and the first magnetic pole layer. The magnetization of the first magnetic pole layer is biased in a direction antiparallel to the direction of the magnetization of the newly provided magnetic layer by static magnetic coupling of the magnetization of the newly provided magnetic layer, for which reason a recording magnetic field may be caused by a magnetization rotation in a direction along an axis of difficult magnetization whereby a recording density is increased. As a result, even if the width "Lx" of a first magnetic pole layer is made narrow as compared to the height "Ly" of the first magnetic pole layer, then the recording characteristic of the magnetoresistive effect head can greatly be improved.

PREFERRED EMBODIMENTS

First Embodiment

A first embodiment according to the present invention will be described in detail with reference to FIG. 3 which is illustrative of a novel magnetoresistive effect composite head having laminations of a magnetoresistive effect head portion as a reproducing head and an inductive head portion as a recording head in a direction from an air bearing face which faces to the surface of the magnetic recording medium. The novel magnetoresistive effect head has a magnetoresistive effect head portion 16 as a reproducing head and an inductive head portion 26 as a recording head. The magnetoresistive effect head portion 16 comprises a sandwiching structure, wherein a magnetoresistive effect element 14 is sandwiched by first and second magnetic isolation layers 181 and 182 which are further sandwiched by first and second magnetic shielding layers 10 and 12. The magnetoresistive effect element 14 comprises a center region 141 capable of sensing magnetic and first and second side regions 142 and 143 which are positioned on opposite sides of the center region 141 for supplying currents and a vertical bias magnetic field to the center region 141. The structure of the magnetoresistive effect head portion of the novel magnetoresistive effect composite head is the same as that of the magnetoresistive effect head portion of the conventional magnetoresistive effect composite head.

The inductive head portion 26 comprises a magnetic gap 24 sandwiched by first and second magnetic pole layers 22 and 20. The second magnetic pole layer 20 of the inductive head portion 26 commonly serves as the second magnetic shielding layer 12. The first and second magnetic pole layers 22 and 20 have thin film coils. The magnetoresistive effect head portion 16 and the inductive head portion 26 are unitary formed with each other in the form of a single composite head. A magnetic isolation layer 32 is newly provided on the first magnetic pole layer 22. A magnetic layer 30 is also newly provided on the magnetic isolation layer 32 so that the magnetic isolation layer 32 is sandwiched between the magnetic layer 30 and the first magnetic pole layer 22. The magnetic layer 30 has a unidirectional magnetization in a direction shown by an arrow mark 301 in parallel to an air bearing face of the head which faces to a surface of the magnetic recording medium and also parallel to the surface of the first magnetic pole layer 22 whereby the magnetic anisotropy of the first magnetic pole layer 22 is stabilized in a direction along an arrow mark 221 by application of a magnetic field from the newly provided magnetic layer 30 so that the magnetization of the first magnetic pole layer 22 is biased in a direction antiparallel to the direction of the magnetization of the newly provided magnetic layer 30 by static magnetic coupling of the magnetization of the newly provided magnetic layer 30, for which reason a recording magnetic field may be caused by a magnetization rotation in a direction along a hard axis of magnetization whereby a recording density is increased. As a result, even if the width "Lx" of a first magnetic pole layer is made narrow as compared to the height "Ly" of the first magnetic pole layer, the recording characteristic of the magnetoresistive effect head can greatly be improved.

The first and second magnetic shielding layers 10 and 12 may be made of NiFe permalloy. The first magnetic shielding layer 10 has a thickness of 2 micrometers. The second magnetic shielding layer 12 has a thickness of 3 micrometers. The center region 141 comprises a NiFe film of 10 nanometers in thickness showing the magnetoresistive effect, a CoZrMo film of 15 nanoemters in thickness for applying a lateral bias magnetic field to the NiFe film, and a Ta film of 7 nanometers in thickness which is disposed between the NiFe film and the CoZrMo film for providing an isolation between them. The CoZrMo film is laminated on the first magnetic shielding layer 10. The Ta film is laminated on the CoZrMo film. The NiFe film is laminated on the Ta film. The center region 141 comprises a NiFe layer which has a width of 0.8 micrometers. Each of the first and second side regions 142 and 143 comprises laminations of a CoPtCr layer which supplies a vertical bias magnetic field to the center region 141 and an Au layer which supplies a current to the center region 141. Each of the first and second side regions 142 and 143 is electrically connected to the center region 141. The CoPtCr layer has a thickness of 25 nanometers. The first and second magnetic isolation layers 181 and 182 comprise alumina layers which isolate the magnetoresistive effect element 14 from the first and second magnetic shielding layers 10 and 12. The first magnetic isolation layer 181 has a thickness of 65 nanometers. The second magnetic isolation layer 182 has a thickness of 90 nanometers.

The magnetic pole layer 22 may be made of NiFe and may be provided by an alignment to the center region 141 of the magnetoresistive effect element 14. The magnetic pole layer 22 may have a width of 1.1 micrometers and a thickness of 3.5 micrometers. The magnetic gap layer 24 may have a magnetic gap distance of 0.25 micrometers. Cu coils are provided in the first and second magnetic pole layers 20 and 22 at a depth of about 2 micrometers from the air bearing surfaces of the first and second magnetic pole layers 20 and 22. The Cu coils are electrically isolated with a photo-resist material. A recording magnetic field is caused in the magnetic gap layer 24 by applying currents to the Cu coils.

The magnetic isolation layer 32 is provided on the first magnetic pole layer 22. The magnetic isolation layer 32 may be made of Cr. The magnetic layer 30 is also provided on the magnetic isolation layer 32. The magnetic layer 30 may be made of CoPtCr. The magnetic isolation layer 32 is sandwiched between the magnetic layer 30 and the first magnetic pole layer 22. The magnetic layer 30 has a unidirectional magnetization in a direction shown by the arrow mark 301 in parallel to the air bearing face of the head which faces to a surface of the magnetic recording medium and also parallel to the surface of the first magnetic pole layer 22 whereby the magnetic anisotropy of the first magnetic pole layer 22 is stabilized in a direction along the arrow mark 221 by application of a magnetic field from the newly provided magnetic layer 30. As a result, the magnetization of the first magnetic pole layer 22 is biased in the direction antiparallel to the direction of the magnetization of the newly provided magnetic layer 30 by static magnetic coupling of the magnetization of the newly provided magnetic layer 30, for which reason a recording magnetic field may be caused by a magnetization rotation in a direction along an axis of difficult magnetization.

FIG. 4 shows variations of normalized outputs of the novel and conventional magnetoresistive effect composite heads versus frequency. A coercive force of the used magnetic recording medium is 2200 oersted (Oe) and the product of a thickness δ thereof and a residual magnetization Br is 90 gauss·μm. A magnetic spacing between the magnetoresistive effect composite head and the magnetic recording medium is about 60 nanometers. A relative speed between the magnetoresistive effect composite head and the magnetic recording medium is 10/millisecond. From FIG. 4, it can be understood that in the frequency range around 100 MHz, the novel magnetoresistive effect composite head according to the present invention is capable of keeping the high normalized output. By contrast, the conventional magnetoresistive effect composite head shows a largely reduction in the normalized output. This means that the above improved structure of the inductive head portion allows a recording magnetic field to be generated by the magnetization rotation in a direction along the hard axis of magnetization for enabling good recording at a sufficiently narrower magnetization transition width even in the high frequency range. By contrast, the conventional magnetoresistive effect composite head shows a remarkable reduction in the normalized output in the high frequency range around 100 MHz as well shown in FIG. 4, but increases the variations in the normalized output in the high frequency range even not shown in FIG. 4. This may be caused by the facts that the recording magnetic field can not be generated in the direction along the axis of difficult magnetization resulting in an insufficient recording in the high frequency range.

As a modification to the above first embodiment, in place of the CoPtCr magnetic layer 30, the magnetic layer 30 may be made of one selected from the group consisting of CoPt, CoPtCr, CoTaCr, CoPtTaCr and the like.

In accordance with the novel magnetoresistive effect head in the first embodiment according to the present invention, the magnetic isolation layer 32 is newly provided on the first magnetic pole layer 22 and a magnetic layer 30 is also newly provided on the magnetic isolation layer 32 so that the magnetic isolation layer 32 is sandwiched between the magnetic layer 30 and the first magnetic pole layer 22. The magnetic layer 30 has a unidirectional magnetization in a direction shown by an arrow mark 301 in parallel to the air bearing face of the head which faces to the surface of the magnetic recording medium and also parallel to the surface of the first magnetic pole layer 22 whereby the magnetic anisotropy of the first magnetic pole layer 22 is stabilized in a direction along an arrow mark 221 by application of a magnetic field from the newly provided magnetic layer 30 so that the magnetization of the first magnetic pole layer 22 is biased in a direction antiparallel to the direction of the magnetization of the newly provided magnetic layer 30 by static magnetic coupling of the magnetization of the newly provided magnetic layer 30, for which reason a recording magnetic field may be caused by a magnetization rotation in a direction along a hard axis of magnetization whereby a recording density is increased. As a result, even if the width "Lx" of a first magnetic pole layer is made narrow as compared to the height "Ly" of the first magnetic pole layer, then the recording characteristic of the magnetoresistive effect head can greatly be improved. A high yield of the magnetoresistive effect head can also be obtained.

Second Embodiment

Figure 5:
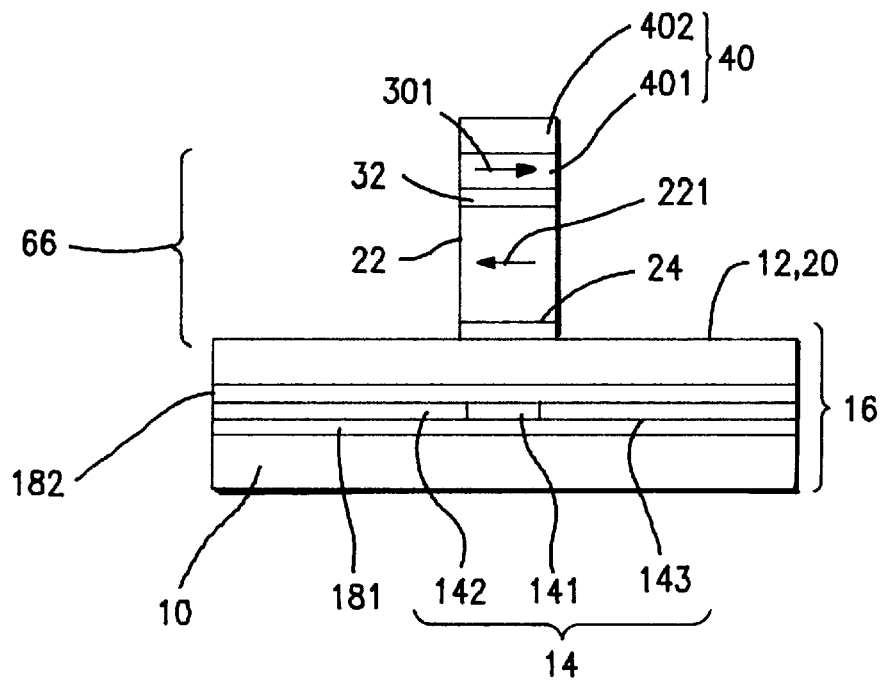
FIG. 5 is a fragmentary cross sectional elevation view illustrative of a novel magnetoresistive effect head having laminations of a magnetoresistive effect head as a reproducing head and an inductive head as a recording head in a direction from an air bearing face which faces to the surface of the magnetic recording medium in a second embodiment according to the present invention.

A second embodiment according to the present invention will be described in detail with reference to FIG. 5 which is illustrative of a novel magnetoresistive effect composite head having laminations of a magnetoresistive effect head portion as a reproducing head and an inductive head portion as a recording head in a direction from an air bearing face which faces to the surface of the magnetic recording medium. The novel magnetoresistive effect head has a magnetoresistive effect head portion 16 as a reproducing head and an inductive head portion 26 as a recording head. The magnetoresistive effect head portion 16 comprises a sandwiching structure, wherein a magnetoresistive effect element 14 is sandwiched by first and second magnetic isolation layers 181 and 182 which are further sandwiched by first and second magnetic shielding layers 10 and 12. The magnetoresistive effect element 14 comprises a center region 141 capable of sensing magnetic and first and second side regions 142 and 143 which are positioned in opposite sides of the center region 141 for supplying currents and vertical bias magnetic field to the center region 141. The structure of the magnetoresistive effect head portion of the novel magnetoresistive effect composite head in this second embodiment is the same as that of the structure of the magnetoresistive effect head portion of the novel magnetoresistive effect composite head in this first embodiment.

The inductive head portion 26 comprises a magnetic gap 24 sandwiched by first and second magnetic pole layers 22 and 20. The second magnetic pole layer 20 of the inductive head portion 26 commonly serves as the second magnetic shielding layer 12. The first and second magnetic pole layers 22 and 20 have thin film coils. The magnetoresistive effect head portion 16 and the inductive head portion 26 are unitary formed with each other in the form of a single composite head. A magnetic isolation layer 32 is newly provided on the first magnetic pole layer 22. A magnetic layer 40 is also newly provided on the magnetic isolation layer 32 so that the magnetic isolation layer 32 is sandwiched between the magnetic layer 40 and the first magnetic pole layer 22. The magnetic layer 40 comprises laminations of a soft magnetic layer 401 and an anti-ferromagnetic layer 402. The soft magnetic layer 401 is laminated on the magnetic isolation layer 32. The anti-ferromagnetic layer 402 is laminated on the soft magnetic layer 401. The soft magnetic layer 401 may preferably be made of NiFe or Co group amorphous materials. The anti-ferromagnetic layer 402 may preferably be made of Mn—X, wherein X is at least one selected from the group consisting of Fe, Ni, Co, Cr, Pt, Pd and Ir, or may preferably be made of at least one oxide selected from the group consisting of Ni—O, Fe—O and Co—O. The magnetic layer 40, for example, the soft magnetic layer 401 has a unidirectional magnetization in a direction shown by an arrow mark 301 in parallel to an air bearing face of the head which faces to a surface of the magnetic recording medium and also parallel to the surface of the first magnetic pole layer 22 whereby the magnetic anisotropy of the first magnetic pole layer 22 is stabilized in a direction along an arrow mark 221 by application of a magnetic field from the newly provided magnetic layer 40 so that the magnetization of the first magnetic pole layer 22 is biased in a direction antiparallel to the direction of the magnetization of the newly provided magnetic layer 40 by static magnetic coupling of the magnetization of the newly provided magnetic layer 40, for which reason a recording magnetic field may be caused by a magnetization rotation in a direction along a hard axis of magnetization whereby a recording density is increased. As a result, even if the width of a first magnetic pole layer is made narrow as compared to the height of the first magnetic pole layer, then the recording characteristic of the magnetoresistive effect head can greatly be improved.

The other structural and functional descriptions of the novel magnetoresistive effect head in this second embodiment are the same as in the first embodiment.

In accordance with the novel magnetoresistive effect head in the second embodiment according to the present invention, the magnetic isolation layer 32 is newly provided on the first magnetic pole layer 22 and a magnetic layer 40 is also newly provided on the magnetic isolation layer 32 so that the magnetic isolation layer 32 is sandwiched between the magnetic layer 40 and the first magnetic pole layer 22. The magnetic layer 40 has a unidirectional magnetization in a direction shown by an arrow mark 301 in parallel to the air bearing face of the head which faces to the surface of the magnetic recording medium and also parallel to the surface of the first magnetic pole layer 22 whereby the magnetic anisotropy of the first magnetic pole layer 22 is stabilized in a direction along an arrow mark 221 by application of a magnetic field from the newly provided magnetic layer 40 so that the magnetization of the first magnetic pole layer 22 is biased in a direction antiparallel to the direction of the magnetization of the newly provided magnetic layer 40 by static magnetic coupling of the magnetization of the newly provided magnetic layer 40, for which reason a recording magnetic field may be caused by a magnetization rotation in a direction along a hard axis of magnetization whereby a recording density is increased. As a result, even if the width of a first magnetic pole layer is made narrow as compared to the height of the first magnetic pole layer, then the recording characteristic of the magnetoresistive effect head can greatly be improved. A high yield of the magnetoresistive effect head can also be obtained.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A multi-layer structure for performing recording operations comprising:

a magnetic pole layer;

a magnetic isolation layer extending over said magnetic pole layer; and a magnetic layer extending over said magnetic isolation layer so that said magnetic layer is isolated by said magnetic isolation layer from said magnetic pole layer, wherein said magnetic layer has a unidirectional magnetization in parallel to an interface between said magnetic isolation layer and said magnetic layer, whilst said magnetic isolation layer is capable of suppressing a generation of exchange coupling between said magnetic layer and said magnetic pole layer, whereby a magnetization of said magnetic pole layer is biased and stabilized in a direction antiparallel to a direction of said magnetization of said magnetic layer by static magnetic coupling of said magnetization of said magnetic layer and said magnetic layer comprises laminations of a soft magnetic layer extending over said magnetic isolation layer and an anti-ferromagnetic layer extending over said soft magnetic layer.

2. The multi-layer structure as claimed in claim 1, wherein said soft magnetic layer is made of NiFe.

3. The multi-layer structure as claimed in claim 1, wherein said soft magnetic layer is made of one selected from the group consisting of Co group amorphous materials.

4. The multi-layer structure as claimed in claim 1, wherein said anti-ferromagnetic layer is made of one selected from the group consisting of Mn—X, where X is at least one selected from the group of Fe, Ni, Co, Cr, Pt, Pd and Ir.

5. The multi-layer structure as claimed in claim 1, wherein said anti-ferromagnetic layer is made of at least one oxide selected from the group consisting of Ni—O, Fe—O and Co—O.

6. A multi-layer structure of an inductive transducer unitary formed with a magnetoresistive effect transducer, said multi-layer structure comprising:

a magnetic pole layer extending over a magnetic gap layer provided on a counterpart magnetic pole layer, wherein said magnetic gap layer is sandwiched between said magnetic pole layer and said counterpart magnetic pole layer, and said counterpart magnetic pole layer serves as one of paired magnetic shielding layers of said magnetoresistive effect transducer;

a magnetic isolation layer extending over said magnetic pole layer; and a magnetic layer extending over said magnetic isolation layer so that said magnetic layer is isolated by said magnetic isolation layer from said magnetic pole layer, wherein said magnetic layer has a unidirectional magnetization in parallel to a face which faces to a surface of a magnetic recording medium and also parallel to an interface between said magnetic isolation layer and said magnetic layer, whilst said magnetic isolation layer is capable of suppressing a generation of exchange coupling between said magnetic layer and said magnetic pole layer, whereby a magnetization of said magnetic pole layer is biased and stabilized in a direction antiparallel to a direction of said magnetization of said magnetic layer by static magnetic coupling of said magnetization of said magnetic layer and said magnetic layer comprises laminations of a soft magnetic layer extending over said magnetic isolation layer and an anti-ferromagnetic layer extending over said soft magnetic layer.

7. The multi-layer structure as claimed in claim 6, wherein said soft magnetic layer is made of NiFe.

8. The multi-layer structure as claimed in claim 6, wherein said soft magnetic layer is made of one selected from the group consisting of Co group amorphous materials.

9. The multi-layer structure as claimed in claim 6, wherein said anti-ferromagnetic layer is made of one selected from the group consisting of Mn—X, where X is at least one selected from the group of Fe, Ni, Co, Cr, Pt, Pd and Ir.

10. The multi-layer structure as claimed in claim 6, wherein said anti-ferromagnetic layer is made of at least one oxide selected from the group consisting of Ni—O, Fe—O and Co—O.

11. A transducer comprising an inductive transducer portion and a magnetoresistive effect transducer portion unitary formed with said inductive transducer portion, said inductive transducer portion comprising:

a magnetic pole layer extending over a magnetic gap layer provided on a counterpart magnetic pole layer, wherein said magnetic gap layer is sandwiched between said magnetic pole layer and said counterpart magnetic pole layer, and said counterpart magnetic pole layer serves as one of paired magnetic shielding layers of said magnetoresistive effect transducer portion;

a magnetic isolation layer extending over said magnetic pole layer; and a magnetic layer extending over said magnetic isolation layer so that said magnetic layer is isolated by said magnetic isolation layer from said magnetic pole layer, wherein said magnetic layer has a unidirectional magnetization in parallel to a face which faces to a surface of a magnetic recording medium and also parallel to an interface between said magnetic isolation layer and said magnetic layer, whilst said magnetic isolation layer is capable of suppressing a generation of exchange coupling between said magnetic layer and said magnetic pole layer, whereby a magnetization of said magnetic pole layer is biased and stabilized in a direction antiparallel to a direction of said magnetization of said magnetic layer by static magnetic coupling of said magnetization of said magnetic layer and said magnetic layer comprises laminations of a soft magnetic layer extending over said magnetic isolation layer and an anti-ferromagnetic layer extending over said soft magnetic layer.

12. The transducer as claimed in claim 11, wherein said soft magnetic layer is made of NiFe.

13. The transducer as claimed in claim 11, wherein said soft magnetic layer is made of one selected from the group consisting of Co group amorphous materials.

14. The transducer as claimed in claim 11, wherein said anti-ferromagnetic layer is made of one selected from the group consisting of Mn—X, where X is at least one selected from the group of Fe, Ni, Co, Cr, Pt, Pd and Ir.

15. The transducer as claimed in claim 11, wherein said anti-ferromagnetic layer is made of at least one oxide selected from the group consisting of Ni—O, Fe—O and Co—O.

16. A magnetoresistive effect composite head comprising an inductive head and a magnetoresistive effect head unitary formed with said inductive transducer portion, said inductive head comprising:

a magnetic pole layer extending over a magnetic gap layer provided on a counterpart magnetic pole layer, wherein said magnetic gap layer is sandwiched between said magnetic pole layer and said counterpart magnetic pole layer, and said counterpart magnetic pole layer serves as one of paired magnetic shielding layers of said magnetoresistive effect head;

a magnetic isolation layer extending over said magnetic pole layer; and a magnetic layer extending over said magnetic isolation layer so that said magnetic layer is isolated by said magnetic isolation layer from said magnetic pole layer, wherein said magnetic layer has a unidirectional magnetization in parallel to a face which faces to a surface of a magnetic recording medium and also parallel to an interface between said magnetic isolation layer and said magnetic layer, whilst said magnetic isolation layer is capable of suppressing a generation of exchange coupling between said magnetic layer and said magnetic pole layer, whereby a magnetization of said magnetic pole layer is biased and stabilized in a direction antiparallel to a direction of said magnetization of said magnetic layer by static magnetic coupling of said magnetization of said magnetic layer and said magnetic layer comprises laminations of a soft magnetic layer extending over said magnetic isolation layer and an anti-ferromagnetic layer extending over said soft magnetic layer.

17. The magnetoresistive effect composite transducer as claimed in claim 16, wherein said soft magnetic layer is made of NiFe.

18. The magnetoresistive effect composite transducer as claimed in claim 16, wherein said soft magnetic layer is made of one selected from the group consisting of Co group amorphous materials.

19. The magnetoresistive effect composite transducer as claimed in claim 16, wherein said anti-ferromagnetic layer is made of one selected from the group consisting of Mn—X, where X is at least one selected from the group of Fe, Ni, Co, Cr, Pt, Pd and Ir.

20. The magnetoresistive effect composite transducer as claimed in claim 16, wherein said anti-ferromagnetic layer is made of at least one oxide selected from the group consisting of Ni—O, Fe—O and Co—O.

* * * * *